United States Patent
Chang

(10) Patent No.: US 8,807,297 B2
(45) Date of Patent: Aug. 19, 2014

(54) MECHANICAL DISK BRAKE CALIPER ASSEMBLY

(71) Applicant: Sirius Disc Brake Technology Ltd., Puxin Township, Changhua County (TW)

(72) Inventor: Chuang-Yi Chang, Puxin Township, Changhua County (TW)

(73) Assignee: Yi-Hsuan Chen, Taichung (TW)

( * ) Notice: Subject to any disclaimer, the term of this patent is extended or adjusted under 35 U.S.C. 154(b) by 52 days.

(21) Appl. No.: 13/763,267

(22) Filed: Feb. 8, 2013

(65) Prior Publication Data

US 2014/0131149 A1 May 15, 2014

(30) Foreign Application Priority Data

Nov. 14, 2012 (TW) .............................. 101142486 A

(51) Int. Cl.
*F16D 65/00* (2006.01)
(52) U.S. Cl.
CPC .................................. *F16D 65/0075* (2013.01)
USPC ........................................... 188/72.9; 188/26

(58) Field of Classification Search
USPC ..................... 188/17, 18 A, 24.11–24.22, 26, 188/72.7–72.9
See application file for complete search history.

(56) References Cited

U.S. PATENT DOCUMENTS

| | | | |
|---|---|---|---|
| 2001/0030086 A1* | 10/2001 | Lumpkin et al. | 188/24.11 |
| 2003/0183460 A1* | 10/2003 | Lumpkin et al. | 188/26 |
| 2014/0131149 A1* | 5/2014 | Chang | 188/73.44 |

* cited by examiner

*Primary Examiner* — Christopher Schwartz
(74) *Attorney, Agent, or Firm* — Muncy, Geissler, Olds & Lowe, P.C.

(57) ABSTRACT

A mechanical disk brake caliper assembly includes a caliper body, a crank arm, a push member defines a push portion biasable by the crank arm, a first brake pad and a second brake pads disposed at two sides relative to a disk brake rotor, a lever arm pivoted to the caliper body and defining a driven arm portion and a bearing arm portion, and a horizontal displacement means for causing the push member to move during rotation of the push member. During movement of the push member, the push portion of the push member pushes the first brake pad and the driven arm portion, causing the bearing arm portion to move the second brake pad toward the first brake pad, and therefore the first and second brake pads are synchronously moved into operative engagement with the disk brake rotor.

6 Claims, 6 Drawing Sheets

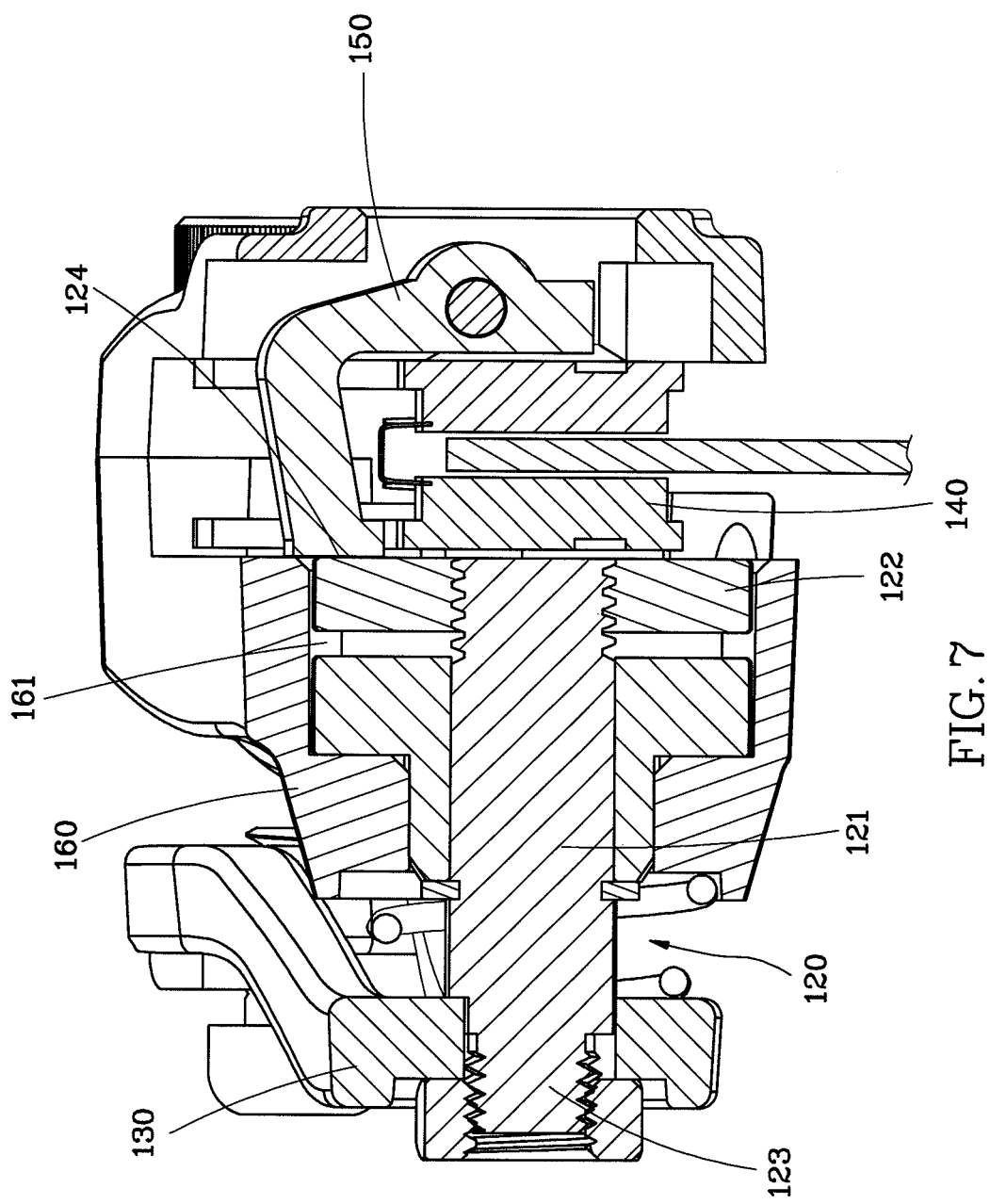

MECHANICAL DISK BRAKE CALIPER ASSEMBLY

BACKGROUND OF THE INVENTION

1. Field of the Invention

The present invention relates to disk brake technology and more particularly, to a mechanical disk brake caliper assembly.

2. Description of the Related Art

Commercial brake mechanisms include drum brake mechanisms and disk brake mechanisms. A disk brake mechanism shows better performance in braking effect and maintenance convenience than a drum brake mechanism. Therefore, disk brake mechanisms are intensively used in vehicle (such as bicycle, electric bicycle) brake systems.

Disk brake mechanisms can be classified into hydraulic disk brake mechanisms and caliper disk brake mechanisms. A hydraulic disk brake mechanism utilizes a hydraulic fluid to move a piston, thereby providing a braking force. A caliper disk brake mechanism uses a brake cable to move brake pads directly. When compared to a hydraulic disk brake mechanism, a caliper disk brake mechanism has the advantages of low cost and low failure rate.

However, some conventional caliper disk brake mechanisms or mechanical disk brake caliper assemblies are designed to be in operative engagement with one side of a disk brake rotor. The braking performance of these caliper disk brake mechanisms or mechanical disk brake caliper assemblies is poor. Further, unilateral application of force can easily cause the disk brake rotor to deform. There are commercial mechanical disk brake caliper assemblies designed to move two opposing brake pads into operative engagement with a disk brake rotor, however, in order to synchronously drive the two opposing disk brake pads into operative engagement with the disk brake rotor, the transmission mechanisms of these conventional mechanical disk brake caliper assemblies may have the drawback of complicated structure or poor transmission performance.

SUMMARY OF THE INVENTION

The present invention has been accomplished under the circumstances in view. It is the main object of the present invention to provide a mechanical disk brake caliper assembly, which has a simple structure and can move two opposing brake pads synchronously into operative engagement with a disk brake rotor.

To achieve this and other objects of the present invention, a mechanical disk brake caliper assembly comprises a caliper body, a push member, a crank arm, a first brake pad, a second brake pad, a lever arm and a horizontal displacement means. The caliper body defines a disk brake rotor slot for receiving a part of a disk brake rotor. The push member is mounted in the caliper body and rotatable about an axis, comprising a push portion and a mating connection portion. The crank arm comprises a connection portion connected to the mating connection portion of the push member, and a driven portion connected to a brake cable. The first brake pad is movably mounted in the disk brake rotor slot of the caliper body at one side relative to the disk brake rotor. The second brake pad is movably mounted in the disk brake rotor slot of the caliper body at an opposite side relative to the disk brake rotor. The lever arm is pivotally mounted in the caliper body, comprising a driven arm portion abutted against the push portion of the push member and a bearing arm portion abutted against the second brake pad. The horizontal displacement means is adapted to move at least a part of the push member horizontally along the axis between a first position and a second position when the push member is rotated by an external force.

When the push member is moved horizontally from the first position toward the second position, the push portion of the push member pushes the first brake pad and the driven arm portion of the lever arm, causing the bearing arm portion of the lever arm to push the second brake pad in direction toward the first brake pad so that the first brake pad and the second brake pad are synchronously forced into operative engagement with the disk brake rotor.

BRIEF DESCRIPTION OF THE DRAWINGS

FIG. 5 is an elevational view of the block member of the mechanical disk brake caliper assembly in accordance with the present invention.

FIG. 7 is a sectional view illustrating the arrangement of another alternate form of the mechanical disk brake caliper assembly with a disk brake rotor in accordance with the present invention.

DETAILED DESCRIPTION OF THE INVENTION

Figure 1:
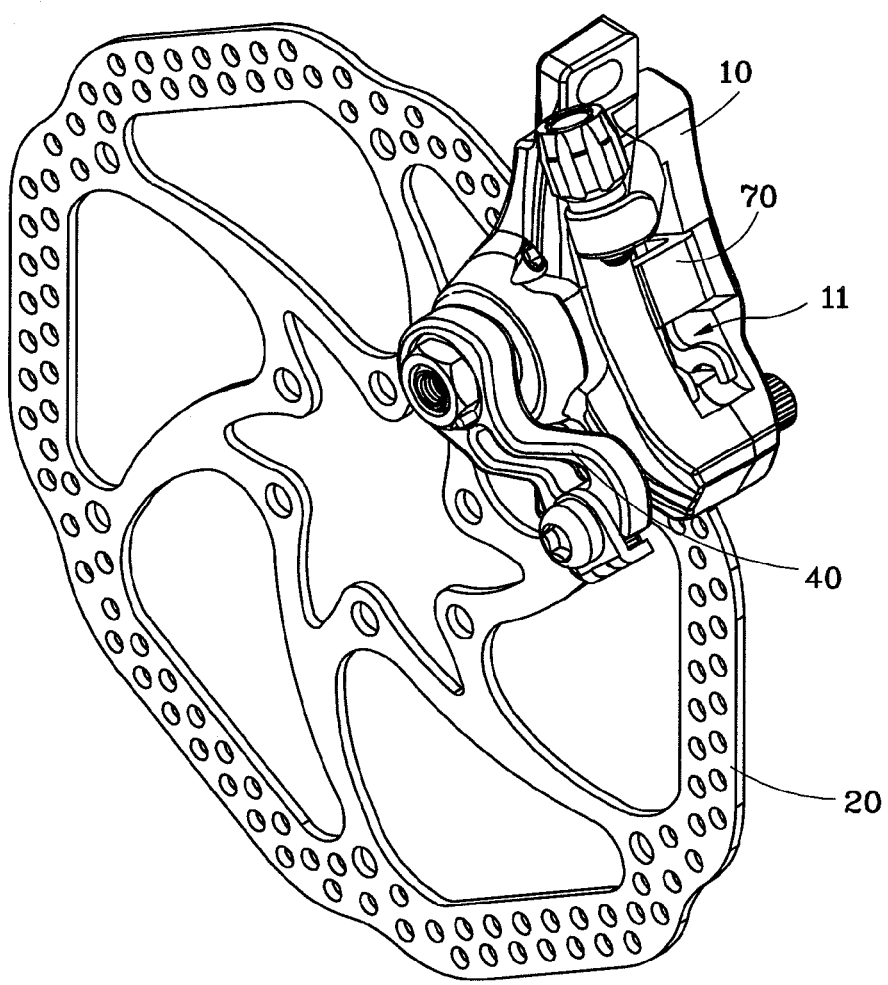
FIG. 1 is an elevational view illustrating a mechanical disk brake caliper assembly arranged with a disk brake rotor in accordance with the present invention.
Figure 2:
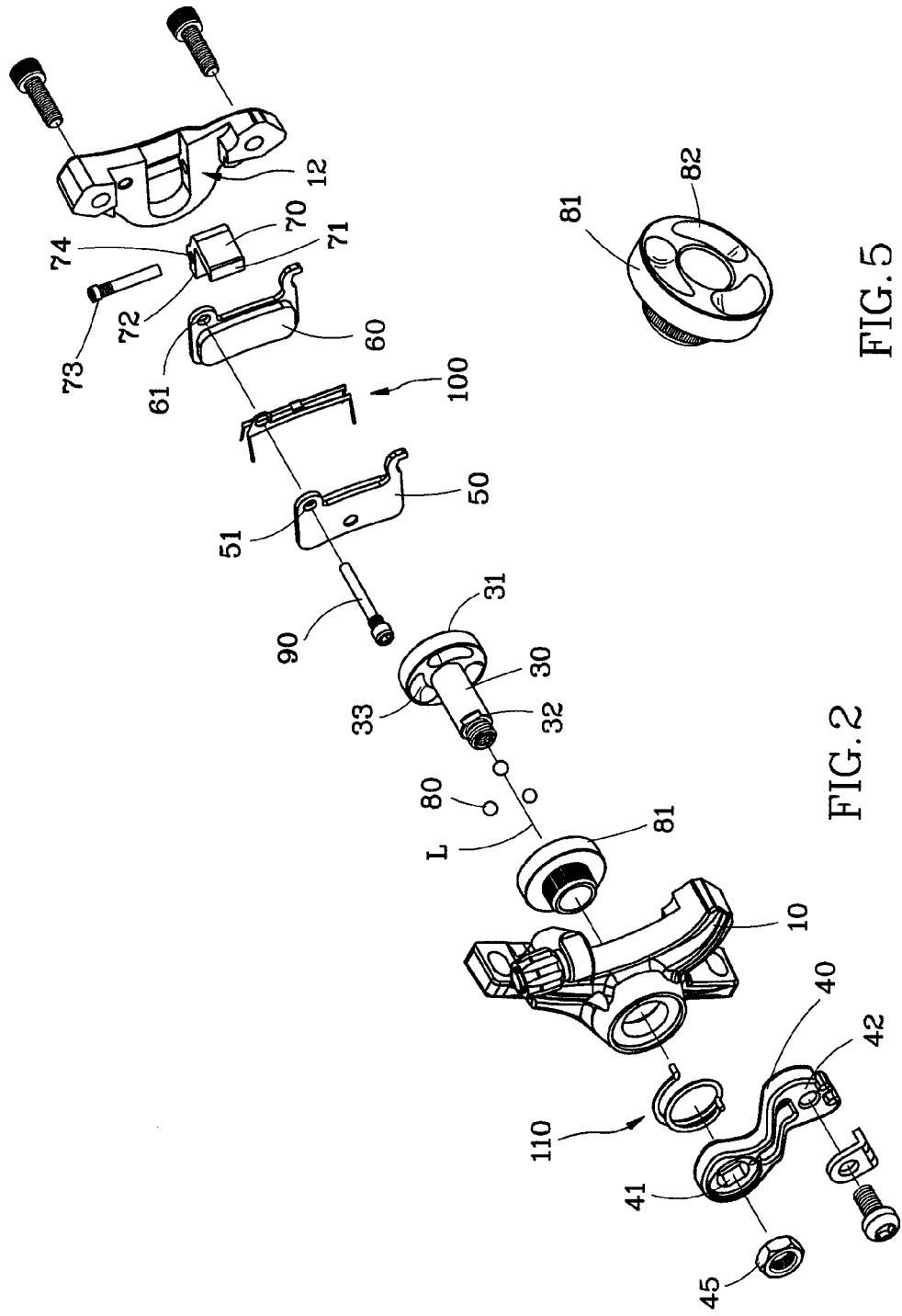
FIG. 2 is an exploded view of the mechanical disk brake caliper assembly in accordance with the present invention.
Figure 3:
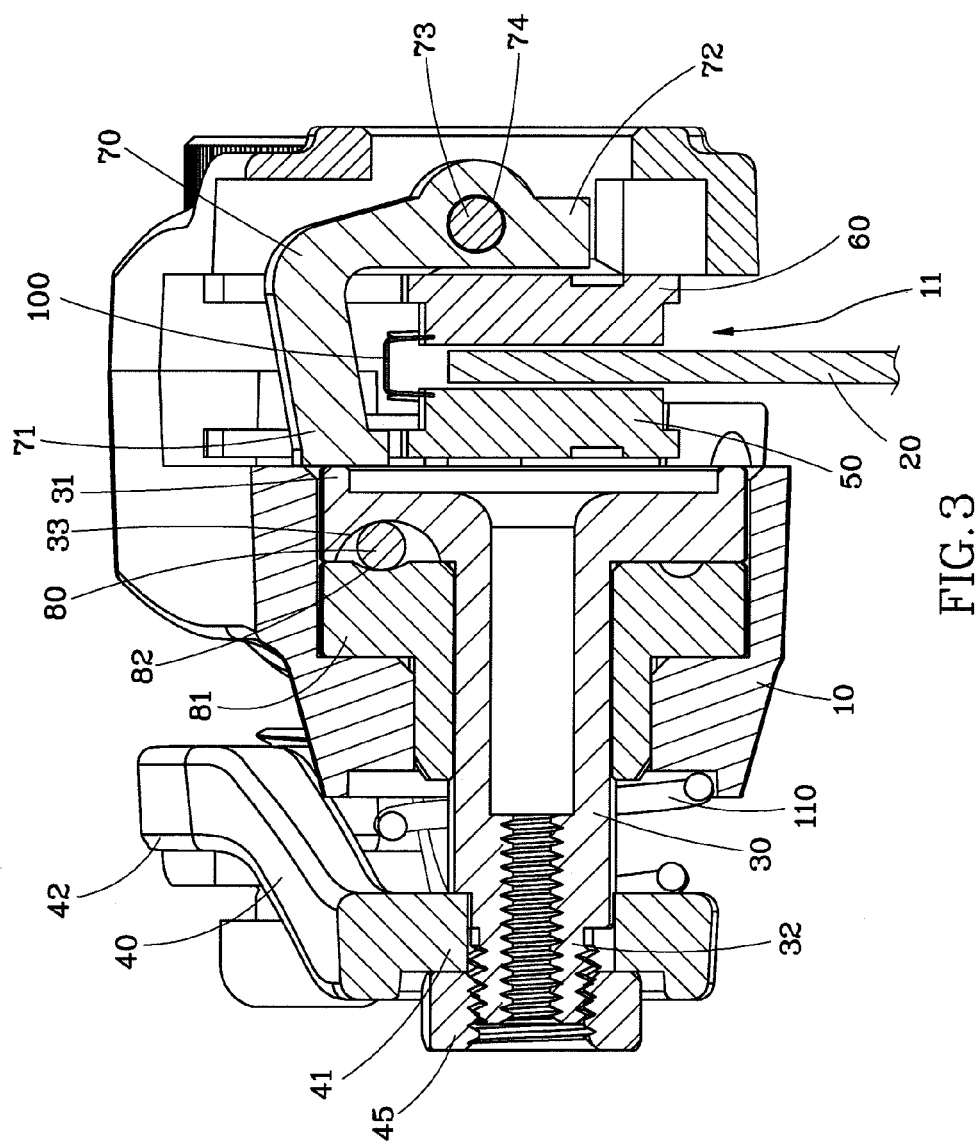
FIG. 3 is a sectional view of the present invention, illustrating the push member of the mechanical disk brake caliper assembly in the first position.

Referring to FIGS. 1-3, a mechanical disk brake caliper assembly in accordance with the present invention is shown mounted to a frame of a vehicle in operative engagement with a disk brake rotor 20. The mechanical disk brake caliper assembly comprises a caliper body 10, a push member 30, a crank arm 40, a first brake pad 50, a second brake pad 60, a lever arm 70 and a horizontal displacement means.

The caliper body 10 comprises a disk brake rotor slot 11, and can be affixed to a frame of a vehicle (for example, bicycle) near a wheel axle. The disk brake rotor 20 is synchronously rotatably mounted at the wheel axle and partially received in the disk brake rotor slot 11.

The push member 30 is mounted in the caliper body 10 and rotatable about an axis L, comprising a push portion 31 and a mating connection portion 32.

The crank arm 40 comprises a connection portion 41 and a driven portion 42. The connection portion 41 is connected to the mating connection portion 32 for synchronous rotation. Further, a nut 45 is mounted in the mating connection portion 32 to affix the crank arm 40 to the mating connection portion 32. The driven portion 42 is for the connection of a brake cable (not shown). Thus, the crank arm 40 can be driven by the brake cable to bias the push member 30.

The first brake pad 50 and the second brake pad 60 are mounted in the disk brake rotor 11 at two opposite sides relative to the disk brake rotor 20.

The lever arm 70 is pivotally connected to the caliper body 10, comprising a driven arm portion 71 abutted against the push portion 31 of the push member 30 and a bearing arm portion 72 abutted against the second brake pad 60. The lever arm 70 is pivotally connected to a pivot support 12 of the caliper body 10 by a pivot 73, having a pivot hole 74 disposed between the driven arm portion 71 and the bearing arm portion 72 for the passing of the pivot 73. However, it is to be understood that the lever arm can be pivotally coupled to the caliper body by any other measures.

Figure 6:
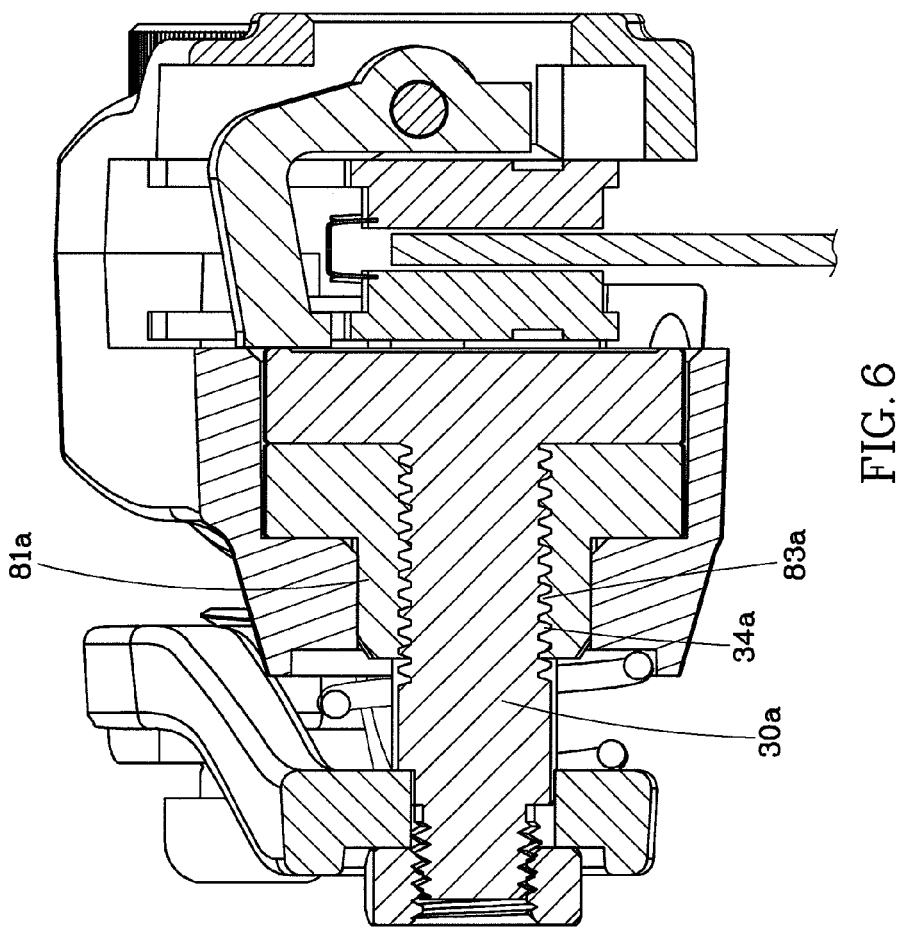
FIG. 6 is a sectional view illustrating the arrangement of an alternate form of the mechanical disk brake caliper assembly with a disk brake rotor in accordance with the present invention.

The aforesaid horizontal displacement means is adapted to move the push member 30 horizontally between a first position (see FIG. 3) and a second position (see FIG. 4) along the axis L during rotation of the push member 30. In the present preferred embodiment, the horizontal displacement means comprises three rolling elements 80, and a block member 81 fixedly mounted in the caliper body 10. The block member 81 defines therein three first arched grooves 82 corresponding to the rolling element 80 (see FIG. 5). The push member 30 defines therein three second arched grooves 33 corresponding to the rolling element 80. The first arched grooves 82 and the second arched grooves 33 are configured having a depth gradually increasing from one end thereof toward an opposite end thereof. The rolling element 80 are held between the first arched grooves 82 and the second arched groove 33. The number of the rolling elements and the first and second arched grooves can be determined subject to actual requirements. Reducing the number of the rolling elements and the first and second arched grooves can reduce the cost. Increasing the number of the rolling elements and the first and second arched grooves can enhance smoothness of the movement of the push member. On the other hand, on the occasion that the friction force can be ignored, the first arched grooves or the second arched grooves can be selectively provided; instead of the rolling elements of the horizontal displacement means, the block member or push member can be configured to provide integrated protruding blocks, Further, the horizontal displacement means may include cam mechanisms other than those disclosed hereinabove for moving the whole push member horizontally, or, as shown in FIG. 6, the horizontal displacement means may include a screw mechanism whose guide threads 34a and 83a are provided between the push member 30a and the block member 81a for causing the push member 30a to move horizontally when it is rotated.

Figure 4:
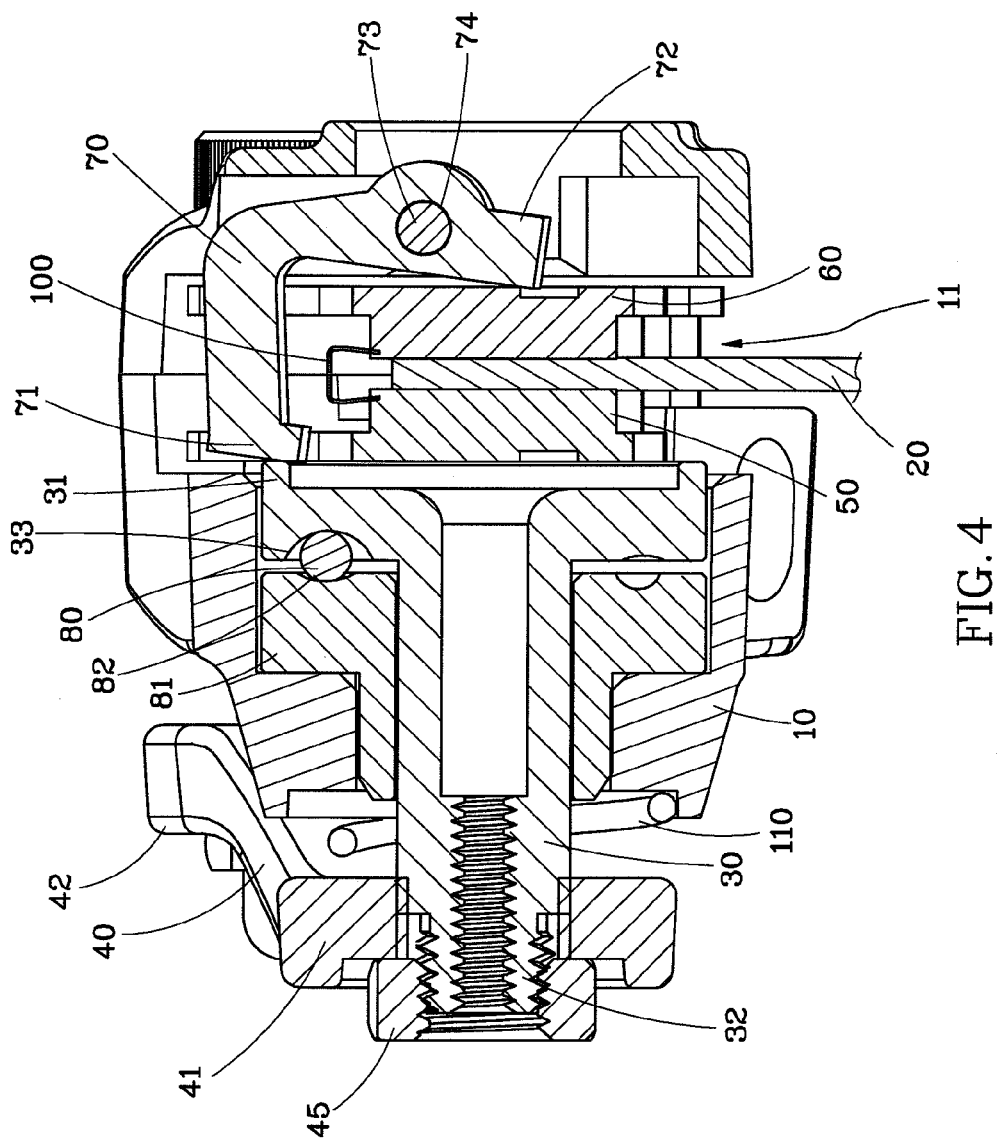
FIG. 4 is a sectional view of the present invention, illustrating the push member of the mechanical disk brake caliper assembly in the second position.

Thus, when the crank arm 40 is driven by the brake cable to bias the push member 30, forcing the push member 30 to move horizontally from the first position shown in FIG. 3 toward the second position shown in FIG. 4, the push portion 31 of the push member 30 will push the first brake pad 50 and the driven arm portion 71 of the lever arm 70. When the lever arm 70 is pushed by the push member 30, the bearing arm portion 72 of the lever arm 70 will push the second brake pad 60 in direction toward the first brake pad 50, and therefore the first brake pad 50 and the second brake pad 60 are moved toward each other into operative engagement with the disk brake rotor 20.

Further, in order to smoothen the movement of the first brake pad 50 and the second brake pad 60, the mechanical disk brake caliper assembly further comprises a guide rod 90 mounted in the caliper body 10 and inserted through a guide hole 51 at the first brake pad 50 and a guide hole 61 at the second brake pad 60 to guide displacement trajectory of the first and second brake pads 50;60, preferably, to guide the first and second brake pads 50;60 into positive abutment against the two opposite sides of the disk brake rotor 20, achieving optimal braking effect.

For enabling the first and second brake pads 50;60 to return to their former positions after braking, the mechanical disk brake caliper assembly further comprises a first elastic member 100 set between the first and second brake pad 50;60 to provide an elastic prestress that moves the first and second brake pad 50;60 apart.

For enabling the crank arm 40 to return to its former position when the brake cable is released, the mechanical disk brake caliper assembly further comprises a second elastic member 110 set between the crank arm 40 and the caliper body 10. This second elastic member 110 can provide a torsional force to reverse the crank arm 40 to its former position when it released from the pressure of the brake cable.

The horizontal displacement means can be so designed that only a part of the push member is moved horizontally thereby. In the embodiment shown in FIG. 7, the push member 120 comprises a screw rod 121, and a screw nut 122 threaded onto the screw rod 121. The screw rod 121 has its one end defined as the mating connection portion 123 that is connected to the crank arm 130. The screw nut 122 is defined as the push portion 124 that is adapted for pushing the first brake pad 140 and the lever arm 150. Further, a linear guide groove 161 is defined in the caliper body 160 to prohibit the screw nut 122 from rotation and to guide movement of the screw nut 122 linearly. Thus, when the screw rod 121 is driven by the crank arm 130 to rotate, the screw nut 122 will be forced to move along the axis between the first position and the second position, achieving a braking action. In other words, the horizontal displacement means in this embodiment is to provide the pushing member with a screw rod and a screw nut that match each other in such a manner that when the screw rod is rotated by an external force, the screw nut is prohibited from rotation and forced to move horizontally.

As stated above, the invention enables the push member to push the first brake pad and the lever arm at the same time, and the movement of the lever arm will push the second brake pad in direction toward the second brake pad, therefore the first brake pad and the second brake pad can be synchronously moved into operative engagement with the disk brake rotor. Therefore, the mechanical disk brake caliper assembly of the present invention has the advantages of simple structure and excellent braking effect, serving to meet the industry's demand.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A mechanical disk brake caliper assembly for operative engagement with a disk brake rotor, the mechanical disk brake caliper assembly comprising:
   a caliper body defining a disk brake rotor slot for receiving a part of said disk brake rotor;
   a push member mounted in said caliper body and rotatable about an axis, said push member comprising a push portion and a mating connection portion;
   a crank arm comprising a connection portion connected to said mating connection portion of said push member and a driven portion connected to a brake cable;
   a first brake pad movably mounted in said disk brake rotor slot of said caliper body at one side relative to said disk brake rotor;
   a second brake pad movably mounted in said disk brake rotor slot of said caliper body at an opposite side relative to said disk brake rotor;

a lever arm pivotally mounted in said caliper body, said lever arm comprising a driven arm portion abutted against said push portion of said push member and a bearing arm portion abutted against said second brake pad; and a horizontal displacement means for moving at least a part of said push member horizontally along said axis between a first position and a second position when said push member is rotated by an external force;

wherein when said push member is moved horizontally from said first position toward said second position, the push portion of said push member pushes said first brake pad and said driven arm portion of said lever arm, causing said bearing arm portion of said lever arm to push said second brake pad in direction toward said first brake pad so that said first brake pad and said second brake pad are synchronously forced into operative engagement with said disk brake rotor.

2. The mechanical disk brake caliper assembly as claimed in claim 1, wherein said horizontal displacement means comprises at least one rolling element, and a block member fixedly mounted in said caliper body, said block member defining therein at least one first arched groove for receiving said at least one rolling element, the depth of each said first arched groove gradually increasing from one end thereof toward an opposite end thereof; said push member comprises at least one second arched groove for receiving said at least one rolling element, the depth of each said second arched groove gradually increasing from one end thereof toward an opposite end thereof.

3. The mechanical disk brake caliper assembly as claimed in claim 1, further comprising a guide rod mounted in said caliper body, wherein said first brake pad and said second brake pad each define a guide hole, said guide rod passing through said guide holes for guidance of said first brake pad and said second brake pad.

4. The mechanical disk brake caliper assembly as claimed in claim 1, further comprising a first elastic member mounted between said first brake pad and said second brake pad to provide an elastic prestress that moves said first brake pad and said second brake pad apart.

5. The mechanical disk brake caliper assembly as claimed in claim 1, further comprising a second elastic member mounted between said crank arm and said caliper body for returning said crank arm when said crank arm is released from said brake cable.

6. The mechanical disk brake caliper assembly as claimed in claim 1, wherein said lever arm comprises a pivot hole disposed between said driven arm portion and said bearing arm portion, and a pivot inserted through said pivot hole; said caliper body comprises a pivot support supporting said pivot.

* * * * *